United States Patent
Zou et al.

(10) Patent No.: US 9,183,428 B2
(45) Date of Patent: Nov. 10, 2015

(54) METHOD AND DEVICE FOR IMPLEMENTING ORIGINAL HANDWRITING TRACE, AND ELECTRONIC DEVICE

(75) Inventors: Xueping Zou, Beijing (CN); Jia Zhou, Beijing (CN); Guoying Du, Beijing (CN)

(73) Assignee: BEIJING ERENEBEN INFORMATION TECHNOLOGY CO., LTD., Beijing (CN)

( * ) Notice: Subject to any disclaimer, the term of this patent is extended or adjusted under 35 U.S.C. 154(b) by 151 days.

(21) Appl. No.: 13/982,749

(22) PCT Filed: Jan. 21, 2012

(86) PCT No.: PCT/CN2012/070693
§ 371 (c)(1),
(2), (4) Date: Jul. 30, 2013

(87) PCT Pub. No.: WO2012/103794
PCT Pub. Date: Aug. 9, 2012

(65) Prior Publication Data
US 2013/0308863 A1 Nov. 21, 2013

(30) Foreign Application Priority Data

Jan. 31, 2011 (CN) .......................... 2011 1 0033937
Jan. 31, 2011 (CN) .......................... 2011 1 0033959

(51) Int. Cl.
*G06K 9/00* (2006.01)
*G06F 3/0488* (2013.01)
*G06T 11/20* (2006.01)

(52) U.S. Cl.
CPC ........ *G06K 9/00154* (2013.01); *G06F 3/04883* (2013.01); *G06K 9/00416* (2013.01); *G06T 11/203* (2013.01)

(58) Field of Classification Search
CPC ....................................................... G06K 9/00
USPC ........................................................ 382/186
See application file for complete search history.

(56) References Cited

U.S. PATENT DOCUMENTS

| 7,072,398 B2 * | 7/2006 | Ma ........................... 375/240.16 |
| 2004/0184659 A1 * | 9/2004 | Bang et al. .................... 382/186 |
| 2012/0308138 A1 * | 12/2012 | Bellegarda et al. ........... 382/181 |

FOREIGN PATENT DOCUMENTS

| CN | 1983143 A * | 6/2007 |
| CN | 101813989 A | 8/2010 |

(Continued)

*Primary Examiner* — Nirav G Patel
*Assistant Examiner* — Delomia Gilliard
(74) *Attorney, Agent, or Firm* — Miles & Stockbridge P.C.

(57) ABSTRACT

The present invention provides a method and device for implementing original handwriting trace, and an electronic device. The method comprises: continuously sampling handwriting trace in time order, and detecting location information and the actual stroke widths at the sampling points; for every two adjacent sampling points, determining the former point as the starting sampling point, determining the latter point as the ending sampling point, using a line connecting the two points as the center line of the stroke between the two sampling points, obtaining location information of and the corresponding longitudinal stroke width at each point on the center line, and determining, according to the location information of and the corresponding longitudinal stroke width at each point on the center line, the fill gray value of each pixel in the stroke; and filling, according to the fill gray values, the corresponding pixels, and displaying the pixels. In this manner, graphic processing of the system is avoided, thereby accelerating the stylized trace processing, and bringing smooth writing experience to users.

25 Claims, 2 Drawing Sheets

(56) References Cited

FOREIGN PATENT DOCUMENTS

| CN | 102103761 | A | | 6/2011 |
| CN | 102103762 | A | | 6/2011 |
| CN | 102103762 | B | * | 11/2012 |
| WO | WO 2012103794 | A1 | * | 8/2012 |

* cited by examiner

METHOD AND DEVICE FOR IMPLEMENTING ORIGINAL HANDWRITING TRACE, AND ELECTRONIC DEVICE

TECHNICAL FIELD

The present invention relates to handwriting input technologies, specifically relates to a method and device for implementing an original handwriting trace and an electronic device.

TECHNICAL BACKGROUND

With the continuous development of science and technology, various electronic devices with a handwriting input system, such as phones, e-books and tablet PCs with a handwriting function, have emerged in the market.

The handwriting tablet PC is integrated with a handwriting input system to replace the traditional keyboard input and can satisfy the needs of mobile office easily in an all-round way; in use, after a user enters texts or graphics on the handwriting input system through a handwriting pen, the texts or graphics are displayed directly on the display interface of the tablet PC.

The following two methods for processing handwriting traces are adopted in the handwriting input systems of the tablet PC currently available in the market.

The first one of the methods is to connect, by lines, the points where the handwriting pen passes by to form an inputted handwriting trace, but such handwriting trace achieved accordingly is not smooth enough and does not look like a real handwriting stylized trace.

The second one of the methods is implemented with curve fitting, that is, computing a smooth curve closest to all sampling points, and drawing the curve with the curve drawing function provided by a graphics system. During the curve drawing, however, the effect and speed of drawing the curve are unsatisfying enough due to the absence of expected purposes despite the powerful functions of the graphics system. Therefore, in use, the user obviously feels that the speed of displaying the handwriting trace lags behind that of handwriting by the user, thus degrading significantly user experience.

SUMMARY OF THE INVENTION

A main object of the present invention is to provide a method and device for implementing an original handwriting trace and an electronic device, so that a handwriting trace handwritten by a user contains a stylized trace, like handwriting on paper, and the handwriting trace can be displayed immediately after being handwritten by the user, thus providing smooth handwriting experience to the user.

To achieve the above-mentioned object, the present invention provides a method for implementing an original handwriting trace, which includes implementation of an intersection point between two intersected strokes by:

a step of determining a stroke width, in which a handwriting trace is sampled continuously and adjacent sampling points are determined according to the sampling time order, with the former one of the adjacent sampling points is determined as a starting sampling point and the latter one of the adjacent sampling points is determined as an ending sampling point; and pressure values and position information of the respective sampling points are detected, and actual stroke widths at the sampling points are determined according to the respective pressure values;

a step of setting a main line, in which a line from the starting sampling point to the ending sampling point is used as a central line of the stroke between the two adjacent sampling points, the position information of and a longitudinal stroke width at each point on the central line are obtained, and one of the central lines of the two intersected strokes is set as the main line in the x-axis direction;

a step of determining, in which filling gray values for pixels corresponding to the intersection point between the two intersected strokes are calculated, according to the position information of and the longitudinal stroke width at each point on the central lines of the two intersected strokes, as well as slopes of the central lines of the two intersected strokes and orientation of the two intersected strokes; and a step of displaying, in which the corresponding pixels are filled according to the filling gray values and displayed.

In an embodiment of the present invention, the step of setting a main line includes: determining the two intersected strokes as a first stroke and a second stroke, respectively, based on the time order, and setting the central line of the first stroke as the main line in the x-axis direction.

In an embodiment of the present invention, the step of determining includes: determining whether an absolute value of the slope of the central line of the second stroke is less than a preset slope value A, and if so, further determining whether the orientation of the second stroke is identical with that of the first stroke, and if so, then with respect to an intersection point between the central lines of the first and second strokes, calculating the longitudinal stroke width $w_j$ corresponding to the intersection point on the first stroke and the longitudinal stroke width $w_j'$ corresponding to the intersection point on the second stroke, and obtaining an absolute value of the difference between the longitudinal stroke widths as $n=|w_j-w_j'|$; then, conducting smooth transition processing around the intersection point between the central lines according to the value of n and the comparative size relationship between $w_j$ and $w_j'$, and calculating the filling gray values for pixels corresponding to the intersection point between the first and second strokes.

In an embodiment of the present invention, the step of determining includes that: it is determined whether the absolute value of the slope of the central line of the second stroke is no less than the preset slope value A, and if so, then two semi-circles, of which centers are located at the intersection point between the central lines of the first and second strokes and diameters are the actual stroke width $d_j$ corresponding to the intersection point between the central lines, are made at the intersection point between the first and second strokes, with both the starting and ending points of one of the semi-circles being located on the longitudinal stroke width $w_j$ of the first stroke, and both the starting and ending points of the other being located on the longitudinal stroke width $w_j'$ of the second stroke; then the filling gray values for pixels limited by the two semi-circles are calculated respectively.

In an embodiment of the present invention, the step of determining includes that: if it is determined that the absolute value of the slope of the central line of the second stroke is less than the preset slope value A, but the orientation of the second stroke is different with that of the first stroke, then the comparative size relationship between the slopes of the central lines of the first and the second strokes are further determined; then one semi-circle, of which the center is located at the intersection point between the central lines of the first and second strokes and the diameter is the actual stroke width $d_j$ corresponding to the intersection point between the central lines, is made at the intersection point between the first and second strokes, with both the starting and ending points of the semi-circle being located on the longitudinal stroke width corresponding to the intersection point on the stroke with the larger slope, and then the filling gray values for pixels limited by the semi-circle are calculated.

In an embodiment of the present invention, conducting the smooth transition processing according to the value of n and the comparative size relationship between $w_j$ and $w_j'$ includes the following steps made at the intersection point:

it is determined whether the value of n is equal to 0, and if so, the intersection point is not further processed, otherwise, the value of n is rounded up, and if 0<n<1, n takes a value of 1, and then, a unit step length on y-axis is equal to $$\frac{|w_j - w_j'|}{2 \times (n+1)};$$

the point on x-axis that corresponds to the intersection point between the central lines is taken as the midpoint, the $$\frac{n}{2}th \text{ or } \frac{n+1}{2}th$$

point close to the side of the first stroke is taken as the start point, and the $$\frac{n}{2}th \text{ or } \frac{n+1}{2}th$$

point close to the side of the second stroke is taken as the end point; and by taking $w_j$ as the initial value and starting from the start point on x-axis, for every increment by a unit step length towards the end point, the longitudinal stroke width $w_{r+1}$ at the corresponding point on the central line is equal to the longitudinal stroke width $w_r$ at the immediately preceding point on the central line plus or minus the unit step length $$\frac{|w_j - w_j'|}{2 \times (n+1)}$$

at both the upper and lower sides of the central line.

In an embodiment of the present invention, calculating the filling gray values for the pixels corresponding to the intersection point between the two intersected strokes includes: calculating the distance $e_r$ from the pixel to a point r on the central line that corresponds to said pixel, and then obtaining the filling gray value for the corresponding pixel by the straight line filling formula: max(0, min(1.0, 0.5×$w_r$−$e_r$+0.5)), where $w_r$ denotes the longitudinal stroke width at the corresponding point r on the central line.

In an embodiment of the present invention, calculating the filling gray values for the pixels limited by the semi-circle includes:

it is first determined whether the endpoint of the stroke accompanied with the semi-circle is a left or right endpoint of the stroke, and it is further determined whether the slope of the central line of the stroke is no less than 0 or not; and if the endpoint of the stroke is the left endpoint and the slope of the central line of the stroke is no less than 0, then for a surrounded region which is above the central line of the stroke and defined by the semi-circle and the longitudinal stroke width corresponding to the intersection point between the central lines within the stroke, the filling gray values for pixels within the surrounded region are obtained by a straight line filling formula: max(0, min(1.0, 0.5×$w_z$−$e_z$+0.5)), where, the surrounded region is particularly above a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up, w denotes the longitudinal stroke width at the intersection point between the central lines within the stroke, d denotes the actual stroke width at the intersection point between the central lines within the stroke, $w_z$ denotes the longitudinal stroke width corresponding to each point in the line extended from the central line at the endpoint side of the stroke, and $e_z$ denotes the distance from the pixel to its corresponding point on the line extended from the central line at the endpoint of the stroke; the filling gray values for the pixels within a region defined by the semi-circle other than the above surrounded region are obtained by a semi-circle filling formula: max(0, min(1.0, 0.5×$d_j$−$e_j$+0.5)), where $e_j$ denotes the distance from the corresponding pixel to the intersection point, and $d_j$ denotes the actual stroke width at the intersection point; and if the endpoint of the stroke is the left endpoint of the stroke and the slope of the central line of the stroke is less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: max(0, min(1.0, 0.5×$w_z$−$e_z$+0.5)), where, the surrounded region is particularly below a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: max(0, min(1.0, 0.5×$d_j$−$e_j$+0.5)).

In an embodiment of the present invention, calculating the filling gray value for the corresponding pixel limited by the semi-circle further includes that:

if the endpoint of the stroke is the right endpoint of said stroke and the slope of the central line of said stroke is no less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$; and if the endpoint of the stroke is the right endpoint of the stroke and the slope of the central line of the stroke is less than 0, then for a surrounded region which is above the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(10, 0.5 \times w_z - e_z + 0.5))$, where, the surrounded region is particularly above a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

In an embodiment of the present invention, if a plurality of filling gray values are provided for a certain pixel, the maximum one of the plurality of gray values is selected.

The present invention also provides a method of the implementing an original handwriting trace, including implementation of the straight stroke width of a stroke by:

a step of determining a stroke width, in which a handwriting trace is sampled continuously, and position information of and actual stroke widths at the respective sampling points are detected;

a step of processing, in which the former sampling point of every two adjacent sampling points is taken as the starting sampling point and the latter sampling point is taken as the ending sampling point, and a line from the starting sampling point to the ending sampling point is taken as the central line of the stroke between the starting and ending sampling points, and then position information of and a longitudinal stroke width at each point on the central line are obtained, and the filling gray value for each pixel within the stroke is determined according to the position information of and the longitudinal stroke width at each point on the central line; and a step of displaying, in which the pixels are filled according to the corresponding filling gray values and displayed.

In an embodiment of the present invention, obtaining the longitudinal stroke width at each point on the central line includes that:

the values of the respective actual stroke widths $d_1$ and $d_n$ of the starting sampling point and the ending sampling point are translated onto y-axis to obtain the corresponding longitudinal stroke widths $w_1$ and $w_n$, and the difference between $w_1$ and $w_n$ is compared with the difference $(x_1 - x_n)$ between x-axis coordinates of the starting sampling point and the ending sampling point to obtain a unit step length $$\frac{w_1 - w_n}{(x_1 - x_n)};$$

then by taking a point on x-axis that corresponds to the starting sampling point as the start point, taking a point on x-axis that corresponds to the ending sampling point as the end point, and taking $w_1$ as the initial value on y-axis, the longitudinal stroke width $w_{i+1}$ at each corresponding point on the central line is equal to the longitudinal stroke width $w_i$ at the immediately preceding point plus the unit step length $$\frac{w_1 - w_n}{(x_1 - x_n)},$$

for every increment by the unit step length towards the end point on x-axis.

In an embodiment of the present invention, the specific process of determining the filling gray value for each pixel within the stroke includes:

calculating the distance $e_i$ from the pixel to the point on the central line that corresponds to the pixel, and obtaining the filling gray value for the pixel by the straight line filling formula: $\max(0, \min(1.0, 0.5 \times w_i - e_i + 0.5))$.

In an embodiment of the present invention, the method further includes implementation of the endpoint of the stroke by:

a step of determining, in which it is determined whether the sampling point is the endpoint of the stroke; and a step of processing, in which semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated.

In an embodiment of the present invention, the determining whether the sampling point is the endpoint of the stroke includes: determining whether the stroke is intersected with another stroke at the sampling point, and if the stroke is not intersected with another stroke at the sampling point, then determining the sampling point as the endpoint of the stroke.

In an embodiment of the present invention, the calculating the filling gray values for the pixels limited by the semi-circle includes that:

it is determined whether the endpoint of the stroke is the left or right endpoint of the stroke, and whether the slope of the central line of the stroke is no less than 0 or not; and if the endpoint of the stroke is the right endpoint of the stroke and the slope of the central line of the stroke is no less than 0, then for a surrounded region which is below the central line and defined by the semi-circle and the longitudinal stroke width $w_k$ at the endpoint k of the central line that corresponds to the right endpoint, the filling gray values for pixels within the surrounded region are obtained by the straight line filling formula: $\max(0, \min(1.0, 0.5 \times w_s - e_s + 0.5))$, where, the surrounded region is particularly below the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: $\max(0, \min(1.0, 0.5 \times d_k - e_k + 0.5))$, where $e_k$ denotes the distance from the corresponding pixel to the endpoint k of the central line;

if the endpoint of the stroke is the right endpoint of the stroke and the slope of the central line of the stroke is less than 0, then for a surrounded region which is above the central line and defined by the semi-circle and the longitudinal stroke width $w_k$ at the endpoint k of the central line that corresponds to the right endpoint, the filling gray values for pixels within the surrounded region are obtained by the straight line filling formula: $\max(0, \min(1.0, 0.5 \times w_s - e_s + 0.5))$, where, the surrounded region is particularly above the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: $\max(0, \min(1.0, 0.5 \times d_k - e_k + 0.5))$, where $e_k$ denotes the distance from the corresponding pixel to the endpoint k of the central line;

if the endpoint of the stroke is the left one of the stroke and the slope of the central line of the stroke is no less than 0, then for a surrounded region which is above the central line and defined by the semi-circle and the longitudinal stroke width $w_k$ at the endpoint k of the central line that corresponds to the left endpoint, the filling gray values for pixels within the surrounded region are obtained by the straight line filling formula: $\max(0, \min(1.0, 0.5 \times w_s - e_s + 0.5))$, where, the surrounded region is particularly above the line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: $\max(0, \min(1.0, 0.5 \times d_k - e_k + 0.5))$, where $e_k$ denotes the distance from the corresponding pixel to the endpoint k of the central line;

if the endpoint of the stroke is the left one of the stroke and the slope of the central line of the stroke is no less than 0, then for a surrounded region which is below the central line and defined by the semi-circle and the longitudinal stroke width $w_k$ at the endpoint k of the central line that corresponds to the left endpoint, the filling gray values for pixels within the surrounded region are obtained by the straight line filling formula: $\max(0, \min(1.0, 0.5 \times w_s - e_s + 0.5))$, where, the surrounded region is particularly below the line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: $\max(0, \min(1.0, 0.5 \times d_k - e_k + 0.5))$, where $e_k$ denotes the distance from the corresponding pixel to the endpoint k of the central line.

The present invention also provides an electronic device, including:

a handwriting display screen, used as an interface for handwriting and for displaying a written handwriting trace;

a sampling detector, used for sampling contact points of the handwriting trace to obtain position information of the sampling points and actual stroke widths at the sampling points; and a microprocessor, which includes an original handwriting trace implementing module, which implements the display of the original handwriting trace containing a stylized trace by any one of the above methods.

The present invention also provides a method for implementing an original handwriting trace by:

a step of determining a stroke width, in which a handwriting trace is sampled continuously in time order, and position information of and actual stroke widths at the respective sampling points are detected;

a step of processing, in which the former sampling point of every two adjacent sampling points is taken as the starting sampling point and the latter sampling point is taken as the ending sampling point, and a line from the starting sampling point to the ending sampling point is taken as the central line of the stroke between the starting and ending sampling points, and then position information of and a longitudinal stroke width at each point on the central line are obtained, and the filling gray value for each pixel within the stroke is determined according to the position information of and the longitudinal stroke width at each point on the central line; and a step of displaying, in which the pixels are filled according to the corresponding filling gray values and displayed.

In an embodiment of the present invention, the method further includes:

a step of determining whether the sampling point is the endpoint of the stroke or the intersection point between the strokes, in which it is determined whether the stroke is intersected with another stroke at the sampling point, and if not, then the sampling point is determined as the endpoint; if the stroke is intersected with another stroke at the sampling point, then the sampling point is determined as the intersection point between the two intersected strokes; and a step of processing the endpoint of the stroke or the intersection point between the strokes, in which if the sampling point is determined as the endpoint of the stroke, then a semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated;

and if the sampling point is determined as the intersection point between the two intersected strokes, then one of the central lines of the two intersected strokes is set as a main line in the x-axis direction, and then the filling gray values for the pixels corresponding to the intersection point between the two intersected strokes are calculated, based on the position information of and the longitudinal stroke width at each point on the central lines of the two intersected strokes, as well as the slopes of the central lines of the two intersected strokes and orientation of the two intersected strokes.

In an embodiment of the present invention, calculating the filling gray values for the pixels corresponding to the intersection point between the two intersected strokes includes: calculating the distance $e_r$ from the pixel to a point r on the central line that corresponds to the pixel, and obtaining the filling gray values for the corresponding pixels by the straight line filling formula: $\max(0, \min(1.0, 0.5 \times w_r - e_r + 0.5))$, where $w_r$ denotes the longitudinal stroke width at the corresponding point r on the central line.

In an embodiment of the present invention, the filling gray value for each pixel within the stroke between the starting sampling point and the ending sampling point is calculated by: calculating the distance $e_r$ from the pixel to a point on the central line that corresponds to the pixel, and obtaining the filling gray value for the corresponding pixel by the straight line filling formula: $\max(0, \min(1.0, 0.5 \times w_i - e_i + 0.5))$.

The present invention further provides a device for implementing an original handwriting trace, including:

a sampling detector, used for sampling a handwriting trace in real time and detecting position information of sampling points and obtaining actual stroke widths at the sampling points; and a microprocessor, which is connected with the sampling detector, used for determining a central line of a stroke between adjacent sampling points, in accordance with the position information of the sampling points, and acquiring the position information of and a longitudinal stroke width at each point on the central line, and determining the filling gray value for each pixel within the stroke according to the position information of and the longitudinal stroke width at the respective point on the central line.

In an embodiment of the present invention, the sampling detector is a pressure sampling detector, which detects the pressure values at the sampling points and obtains the actual stroke widths at the sampling points by using the pressure values at the sampling points.

The microprocessor includes: a sampling determination module, which is connected with the sampling detector and used for determining whether the sampling point is endpoint of the stroke or intersection point between the strokes;

a processing module, which is connected with the sampling determination module and used for obtaining the filling gray value for the pixel at the sampling point in accordance with the determination result from the sampling determination module, and obtaining the filling gray value for each pixel within the stroke between the adjacent sampling points; and a filling module, which is connected with the processing module, and used for filling each pixel in accordance with the filling gray value obtained by the processing module.

In an embodiment of the present invention, the obtaining the filling gray value for each pixel by the processing module in accordance with the determination result from the sampling determination module is specifically as follows:

if the sampling point is the endpoint of the stroke, then a semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated; and if the sampling point is the intersection point between the two intersected strokes, then one of the central lines of the two intersected strokes is set as the main line in the x-axis direction, and the filling gray values for the pixels corresponding to the intersection point between the two intersected strokes are calculated, based on the position information of each point on the central lines of the two intersected strokes and the longitudinal stroke width at the point, as well as the slopes of the central lines of the two intersected strokes and the orientation of the two intersected strokes.

The beneficial effect of the present invention lies in that: with the method and device for implementing the original handwriting trace and the electronic device provided in the present invention, the contact point is sampled in real-time, the position information of sampling points and the actual stroke widths at the sampling points can be obtained, and then the central line of the stroke between the adjacent sampling points as well as the position information of each point on the central line and longitudinal stroke width at the point can be obtained based on the position information of sampling points and the actual stroke widths at the sampling points, further, the filling gray value for the pixel corresponding to the intersection point between the intersected strokes can be obtained based on the position information of each point on the central lines of the intersected strokes and longitudinal stroke width at the point as well as the orientation of the intersected strokes and the slopes of the central lines of the intersected strokes, and then the corresponding pixel can be filled, in order to display the handwritten handwriting trace containing the stylized trace.

In addition, the method provided by the present invention does not involve complicated curve drawing, but directly operates the underlying graphics module to display a bitmap constructed from the handwriting trace thereon, so as to avoid system graphics processing, thus accelerating the stylized trace processing and providing the smooth handwriting experience to the user, meanwhile, the method of the present invention is simple to significantly reduce the system overhead.

DETAILED DESCRIPTION OF THE PREFERRED EMBODIMENT

Figure 1:
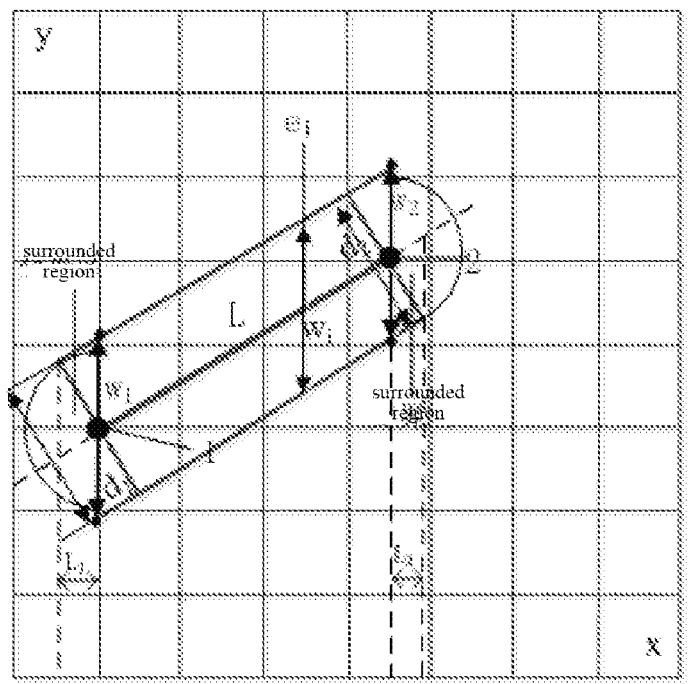
FIG. 1 is a schematic diagram for processing a single stroke that is not intersected with another stroke according to an embodiment of the present invention.

With respect to the problems that the handwriting stylized trace of characters written by a user cannot be displayed or the speed of displaying the handwriting trace significantly lags behind that of handwriting by the user during the stylized trace processing, which are present in the existing handwriting input system, such as the handwriting processing method employed in tablet PC, the present invention is to provide a new method for implementing an original handwriting trace, which does not require for complicated curve drawing, but directly operates the underlying graphics module to display a bitmap constructed from the handwriting trace, so as to avoid graphics processing of the system, accelerate the stylized trace processing speed and provide the smooth handwriting experience for the user.

The present invention will be further described in detail with following specific embodiments in conjunction with the accompanying drawings.

During writing of different strokes, different pressures are usually applied when writing different strokes, for example the higher pressure at the first point of the stroke and the less pressure at the last point of the stroke, so that the thickness of the handwritten stroke may be changed with the pressure changes, thus the effect of stylized trace may be shown. A method for implementing a stylized trace in present embodiment is described with respect to a tablet PC, for example. A character may be split into individual strokes, including 1) a single stroke exists alone and 2) intersected strokes, depending on the relation between the strokes. The stroke referred to in the embodiment is an individual stroke determined by adjacent sampling points, not a stroke referred to in a Chinese character, that is, even a stroke of a Chinese character, such as a bend, a turning and a hook, is split into multiple continuous individual strokes determined by a starting sampling point and an ending sampling point.

In view of the above circumstance, in the case of a single stroke that is present alone, it is need to deal with a varying width along the stroke as well as the two endpoints of the stroke; in the case of intersected strokes, the intersection point (i.e. inflection point) between the intersected strokes is needed to be processed. Due to the varying thickness along the stroke, the corresponding sampling frequency is used to sample contact points of a handwriting trace handwritten by the user in the embodiment, where each stroke is determined by every two adjacent sampling points, then the determined stroke is processed correspondingly in accordance with the detected position information and pressure value about the sampling points as follows.

A correspondence relationship between a pressure value and a stroke width is stored in advance in a storage device, so that a corresponding stroke width can be obtained according to the detected pressure value about the sampling point, here, the stroke width obtained is the actual stroke width. For example, the pressure is divided into 1024 grades and a one-to-one correspondence relationship, which may be represented as a function, a table or the like, is established between the pressure value and the stroke width, so that a corresponding actual stroke width can be obtained according to the detected pressure value. To achieve a higher accuracy, the pressure can also be divided into more grades, such as 2048 grades.

Subsequently, a sampling frequency is set according to the actual situation. For example, in handwriting regular script, a lower sampling frequency as selected may be satisfying due to the relatively slow speed of handwriting, but in handwriting running script or cursive script, a higher sampling frequency may be selected due to a relatively high speed of handwriting, so as to ensure a good effect of the handwriting trace. A sampling frequency of 120 sampling points per second may be preferably selected in an embodiment to ensure the good effect of the handwriting trace.

Handwriting contact points by the user are sampled based on the selected sampling frequency, and a stroke is determined by two adjacent sampling points. Here, the former one of the two adjacent sampling points is determined as the starting sampling point and the latter one of the two adjacent sampling points is determined as the ending sampling point, based on time order. For example, for sampling points 1, 2 and 3 collected in sequence, the sampling points 1, 2 are adjacent sampling points, and a stroke may be determined by taking the sampling point 1 as a starting sampling point and taking the sampling point 2 as an ending sampling point; similarly, the sampling points 2, 3 are adjacent sampling points, and a stroke may be determined by taking the sampling point 2 as a starting sampling point and taking the sampling point 3 as an ending sampling point, and so on. Then the actual stroke width d at a sampling point can be obtained according to the pressure value at the sampling point. In the present embodiment, the direction of the actual stroke width d at a sampling point is perpendicular with the central line of the stroke determined by the sampling points. Based on position information (such as coordinate information) of a sampling point and the actual stroke width d at the sampling point, the central line of the stroke determined by the adjacent sampling point as well as the position information of each point on the central line and the longitudinal stroke width at the point on the central line can be obtained. The longitudinal stroke width at the sampling point refers to a corresponding y-axis value transformed from the actual stroke width at the sampling point. The filling gray value for each pixel within the stroke can be obtained in accordance with the position information of each point on the central line and the longitudinal stroke width corresponding to each point on the central line. In present embodiment, the sampling points 1 and 2 are selected as an example for further explanation.

Referring to FIG. 1, the actual stroke widths at the sampling points 1 and 2 are denoted respectively by $d_1$ and $d_2$, and coordinates of the points 1 and 2 are respectively $(x_1, y_1)$ and $(x_n, y_n)$. The central line L connecting the sampling points 1 and 2 can be obtained according to the coordinate information of the sampling points, and the central line L may be classified as a main line on x-axis or a main line on y-axis according to its slope. When the slope of the central line L is less than or equal to 1, the central line L is classified as the main line on x-axis, otherwise as the main line on y-axis; when the central line L is the main line on y-axis, the interconverting between the x-axis and the y-axis may convert the central line L into the main line on x-axis. Therefore, it is not distinguished between the main lines on x-axis and y-axis in the present embodiment, and in any case the central line L is converted into the main line on x-axis (refer to FIG. 1), then the longitudinal stroke widths $w_1$ and $w_2$ in the y-axis direction at the sampling points 1 and 2 can be obtained according to the actual stroke widths $d_1$ and $d_2$, and the coordinate information of each point on the central line can be obtained according to the coordinates $(x_1, y_1)$ and $(x_n, y_n)$ by a DDA algorithm (i.e. Digital Differential Analyzer), in which the unit step along the x-axis may be one pixel. Then, the longitudinal stroke width corresponding to each point on the central line will be computed as follows.

In FIG. 1, if the longitudinal stroke width at the starting sampling point 1 is $w_1$, and the longitudinal stroke width $w_2$ at the ending sampling point 2 is $w_n$, the difference between $w_1$ and $w_n$ is compared with the difference $(x_1-x_n)$ between x-axis coordinates of the starting sampling point 1 and the ending sampling point 2 to obtain a unit step length $$\frac{w_1 - w_n}{(x_1 - x_n)};$$

then by taking a point on x-axis that corresponds to the starting sampling point 1 as the start point, taking a point on x-axis that corresponds to the ending sampling point 2 as the end point, and taking $w_1$ as the initial value on y-axis, the longitudinal stroke width $w_{i-1}$ at each corresponding point on the central line is equal to the longitudinal stroke width $w_i$ at the immediately preceding point plus the unit step length $$\frac{w_1 - w_n}{(x_1 - x_n)},$$

for every increment by the unit step length towards the end point on x-axis; here, the increment of unit step length on x-axis in obtaining the longitudinal stroke width corresponding to each point on the central line is identical with the increment of unit step length in obtaining the position information of each point on the central line, i.e. one pixel. Accordingly, if the obtained unit step length is $$\frac{w_1 - w_n}{(x_1 - x_n)},$$

the longitudinal stroke width $w_{i+1}$ at each corresponding point on the central line is equal to the longitudinal stroke width $w_i$ at the immediately preceding point plus the unit step length $$\frac{w_1 - w_n}{(x_1 - x_n)},$$

for every increment by the unit step length on x-axis towards the end point.

Specifically, by taking the starting sampling point 1 as the start point and taking the longitudinal stroke width $w_1$ as the initial value, in the case of every increment by one unit step length towards the ending sampling point 2 on x-axis, the longitudinal stroke width $w_{i+1}$ at the corresponding point on the central line is equal to the longitudinal stroke width $w_i$ at the immediately preceding point plus the unit step length $$\frac{w_1 - w_n}{(x_1 - x_n)};$$

for example, if the unit step length on x-axis is equal to one pixel, the longitudinal stroke width at the point next to the starting sampling point 1 on the central line is $$w_1 + \frac{w_n - w_1}{(x_n - x_1)}.$$

In this way, the longitudinal stroke width at each point on the central line can be obtained by successive increment of one pixel on x-axis until the end point on x-axis that corresponds to the ending sampling point 2.

In determining the filling gray values for pixels corresponding to each point on the central line in accordance with the position information of the point and the corresponding longitudinal stroke width at the point, it is needed to determine the distance from each of the pixel to the point on the central line corresponding to the pixel. In the present embodiment, in obtaining the position information of each point on the central line and the longitudinal stroke width at the point, the unit step length on x-axis is equal to one pixel and each point on the central line corresponds to a column of pixels, thus the distance $e_i$ from the center of the pixel to the corresponding point on the central line is equal to the difference between the y-axis coordinate value for the center of the pixel and the y-axis coordinate value for the corresponding point on the central line. Therefore, to obtain the distance $e_i$ from the center of the pixel to the corresponding point on the central line, it is only required to carry out simple addition and subtraction operations, without operations such as multiplication, division, square root and the like, thus greatly reducing the amount of computation to save computing time and system overhead, thereby accelerating the processing and improving the user experience.

Figure 2:
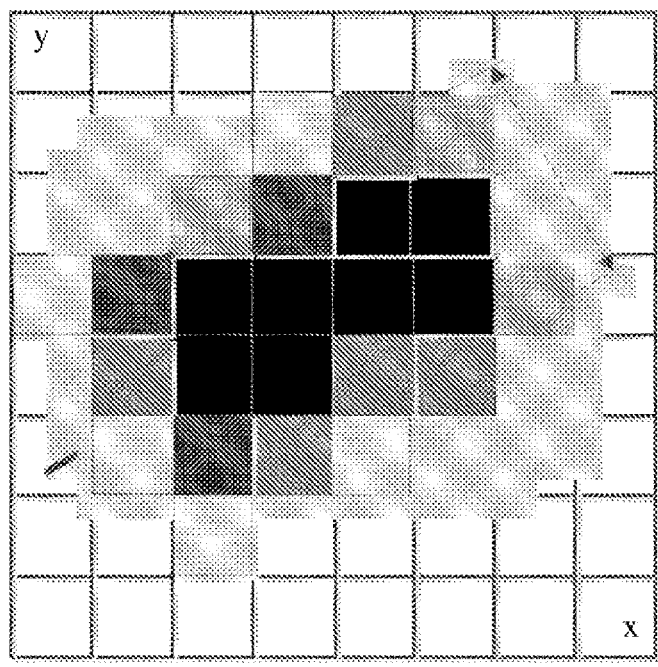
FIG. 2 is a schematic diagram showing the effect of filling a straight width of a stroke according to an embodiment of the present invention.

After the distance $e_i$ from the pixel to the corresponding point i on the central line is computed, the corresponding filling gray values for the pixels may be obtained by a straight line filling formula: $\max(0, \min(1.0, 0.5 \times w_i - e_i + 0.5))$, where $w_i$ denotes the longitudinal stroke width at the corresponding point i on the central line. For example, when the value of $0.5 \times w_i - e_i$ is 0.3, the filling gray value for the pixel is 0.8; when the value of $0.5 \times w_i - e_i$ is $-0.5$, the filling gray value for the pixel is 0; and when the value of $0.5 \times w_i - e_i$ is 1, the filling gray value for the pixel is 1. The filling effect of the straight stroke width of the stroke is shown in FIG. 2.

In the present embodiment, the above computing of the position information of a certain point on the central line, the longitudinal stroke width at the point and the filling gray values for the pixels corresponding to the point can be performed simultaneously. For example, when the y-axis coordinate value $y_i$ of a certain point on the central line is obtained by using the DDA algorithm, the longitudinal stroke width at the point can be obtained according to $$w_i = w_{i-1} + \frac{w_n - w_1}{(x_n - x_1)},$$

and then the filling gray values for the pixels corresponding to the point can be obtained by the straight line filling formula: $\max(0, \min(1.0, 0.5 \times w_i - e_i + 0.5))$, and then the position information of each subsequent point on the central line, the longitudinal stroke width at the subsequent point and the filling gray values for the pixels corresponding to the subsequent point can be computed successively in the above manner.

In processing the stroke, it is also needed to process the endpoint of the stroke, which requires for determining whether the two sampling points of the stroke are the endpoint of the stroke, that is, determining whether any sampling point of the stroke is intersected with another stroke; if not, then the sampling point is an endpoint of the stroke, and subsequently it is determined whether the slope of the central line of the stroke is no less than 0 or is less than 0, and further it is determined whether the endpoint of the stroke is the left endpoint or right endpoint of the stroke. Then, a semi-circle, of which the center is the endpoint k of the central line that corresponds to the endpoint of the stroke, and of which the diameter is the actual stroke width $d_k$ corresponding to the endpoint k of the central line, is made, with both the starting and ending points of the semi-circle being located on the longitudinal stroke width $w_k$ corresponding to the endpoint k of the central line, and then the filling gray values for pixels defined by the semi-circle will be computed, specifically as follows.

If the endpoint of the stroke is the left endpoint and the slope of the central line of the stroke is no less than 0, then for a surrounded region which is above the central line and defined by the semi-circle and the longitudinal stroke width $w_k$ corresponding to the endpoint k of the central line, the filling gray values for pixels within the surrounded region are obtained by the straight line filling formula: $\max(0, \min(1.0, 0.5 \times w_s - e_s + 0.5))$, where, the surrounded region is particularly above a line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke. Here, $$\frac{w_k - d_k}{2}$$

is rounded up, for example, $$\frac{w_k - d_k}{2}$$

equal to 1.2 results in a value of 2; $w_s$ denotes the longitudinal stroke width at each point in the line extended from the central line at the endpoint of the stroke, $e_s$ denotes the distance from a pixel to its corresponding point on the line extended from the central line at the endpoint of the stroke; in the present embodiment, the position information of each point in the line extended from the central line can be obtained by the DDA algorithm used in determining the position information of each point on the central line, and the longitudinal stroke width $w_s$ at each point in the line extended from the central line takes the value of $w_k$; the filling gray values for other pixels at the side of the left endpoint of the stroke (i.e. those pixels within the region defined by the semi-circle other than the above surrounded region) are obtained by the semi-circle filling formula: $\max(0, \min(1.0, 0.5 \times d_k - e_k + 0.5))$, where $e_k$ may be calculated by a formula for calculating the distance between two points. The value of $e_k$ is generally small in the present embodiment and thus may be obtained from a pre-calculated table and used in the semi-circle filling formula, in order to optimize the operation speed.

If the endpoint of the stroke is the left one of the stroke and the slope of the central line of the stroke is less than 0, then for a surrounded region which is below the central line and defined by the semi-circle and the longitudinal stroke width $w_k$ corresponding to the endpoint k of the central line, the filling gray values for pixels within the surrounded region are obtained by the straight line filling formula: $\max(0, \min(1.0, 0.5 \times w_s - e_s + 0.5))$, where, the surrounded region is particularly below the line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke. Here, $$\frac{w_k - d_k}{2}$$

is rounded up, $w_s$ denotes the longitudinal stroke width at each point in the line extended from the central line at the endpoint of the stroke, $e_s$ denotes the distance from a pixel to its corresponding point on the line extended from the central line at the endpoint of the stroke; and the filling gray values for other pixels at the side of the left endpoint of the stroke (i.e. those pixels within the region defined by the semi-circle other than the above surrounded region) are obtained by the semi-circle filling formula: max(0, min(1.0, 0.5×$d_k$−$e_k$+0.5)), where $e_k$ may be calculated by a formula for calculating the distance between two points.

If the endpoint of the stroke is the right endpoint of the stroke and the slope of the central line of the stroke is no less than 0, then for a surrounded region which is below the central line and defined by the semi-circle and the longitudinal stroke width $w_k$ corresponding to the endpoint, the filling gray values for pixels within the surrounded region are obtained by the straight line filling formula: max(O, min(1.0, 0.5×$w_s$−$e_s$+0.5)), where, the surrounded region is particularly below the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke. Here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; and the filling gray values for other pixels at the side of the right endpoint of the stroke are obtained by the semi-circle filling formula: max(0, min(1.0, 0.5×$d_k$−$e_k$+0.5)).

If the endpoint of the stroke is the right endpoint of the stroke and the slope of the central line of the stroke is less than 0, then for a surrounded region which is above the central line and defined by the semi-circle and the longitudinal stroke width $w_k$ corresponding to the endpoint, the filling gray values for pixels within the surrounded region are obtained by the straight line filling formula: max(0, min(1.0, 0.5×$w_s$−$e_s$+0.5)), where, the surrounded region is particularly above the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke. Here, $$\frac{w_k - d_k}{2}$$

is rounded up, $w_s$ denotes the longitudinal stroke width at each point in the line extended from the central line at the endpoint of the stroke, $e_s$ denotes the distance from a pixel to its corresponding point on the line extended from the central line at the endpoint of the stroke; and the filling gray values for other pixels at the side of the right endpoint of the stroke are obtained by the semi-circle filling formula: max(0, min (1.0, 0.5×$d_k$−$e_k$+0.5)).

For example, assuming that both ends of the stroke determined by the sampling points 1 and 2 in FIG. 1 are the endpoints of the stroke, and the slope of the central line L of the stroke is greater than 0, then in processing the left endpoint of the stroke, a semi-circle of which the center is the sampling point 1 and the diameter is $d_1$ is made, and the semi-circle is intersected with both ends of the longitudinal stroke width $w_1$ at the sampling point 1, respectively, thus for the upper part of the surrounded region defined by the semi-circle and the longitudinal stroke width $w_1$, the filling gray values for pixels can be obtained by the straight line filling formula: max(0, min(1.0, 0.5×$w_s$−$e_s$+0.5)). As shown in FIG. 1, the surrounded region is particularly consisted of pixels above a line extended from the central line and corresponding to a segment $L_1$ on x-axis, which has a length of $$\frac{w_1 - d_1}{2}$$

and runs towards the left starting from a point $x_1$ on x-axis that corresponds to the sampling point 1. The position information of each point in the line extended from the central line L corresponding to the segment $L_1$ is calculated by the DDA algorithm used in calculating the position information of each point on the central line L, the longitudinal stroke width at each point in the line extended from the central line L may take a value of $w_1$, and the filling gray values for pixels within the region at the side of the left endpoint other than the surrounded region can be obtained by the semi-circle filling formula: max(0, min(1.0, 0.5×$d_1$−$e_1$+0.5)). On the contrary, in processing the right endpoint at the sampling point 2, for the lower part of the surrounded region defined by the semi-circle and the longitudinal stroke width $w_2$, the filling gray values for pixels can be obtained by the straight line filling formula: max(0, min(1.0, 0.5×$w_s$−$e_s$+0.5)). As shown in FIG. 1, the surrounded region is particularly consisted of pixels below the line extended from the central line and corresponding to a segment $L_2$ on x-axis, which has a length of $$\frac{w_2 - d_2}{2}$$

and runs towards the right starting from a point $x_2$ on x-axis that corresponds to the sampling point 2. Likewise, the position information of each point in the line extended from the central line L corresponding to the segment $L_2$ is calculated by the DDA algorithm used in calculating the position information of each point on the central line L, the longitudinal stroke width at each point in the line extended from the central line L may take a value of $w_2$, and the filling gray values for pixels within the region at the side of the right endpoint other than the surrounded region can be obtained by the semi-circle filling formula: $\max(0, \min(1.0, 0.5 \times d_2 - e_2 + 0.5))$.

It is noted that, when the slope of the central line L of the stroke is equal to 0, the actual stroke width d and the longitudinal stroke width w at the sampling point is coincided with each other (i.e. d=w), which means the surrounded region does not exist, that is, pixels located within the surrounded region as described above do not exist. Therefore, the endpoint may be processed by only the semi-circle filling formula.

In the case of intersected strokes, it is also required to process the intersection point (i.e. inflection point) between the intersected strokes. In processing the intersection point, after the actual stroke widths and the longitudinal stroke widths at the sampling points as well as the position information of and the longitudinal stroke width at each point on the central line are detected by the above steps, it further includes the steps of:

setting the main line: in which a line from the starting sampling point to the ending sampling point is used as the central line of the stroke between these two sampling points, and one of the central lines of two intersected strokes is set as the main line in the x-axis direction;

determining: in which the filling gray values for the pixels corresponding to the intersection point between the two intersected strokes are calculated, according to the position information of and the longitudinal stroke width at each point on the central lines of the two intersected strokes, as well as the slopes of the central lines of the two intersected strokes and orientation of the two intersected strokes; and displaying: in which the corresponding pixels are filled according to the obtained filling gray values and displayed.

In the present embodiment, setting the main line includes: determining the two intersected strokes as a first stroke and a second stroke, respectively, according to time order, and setting the central line of the first stroke as the main line in the x-axis direction.

After the main line is set, it is determined whether the slope of the central line of the second stroke is less than a preset slope value A. In the present embodiment, the value of A is determined as A=1+a, where "a" denotes a compensation value preferably in a range from 0 to 0.5, that is, the value of A is no less than 1 and no greater than 1.5. It can be understood that the specific value of A can be selected as 1.5 according to requirements such as the stroke thickness and the processing speed. In the present embodiment, to accelerate the stroke processing speed as much as possible, the value of A is preferably 1.5. If the slope of the central line of the second stroke is less than 1.5, then it is further determined whether the orientation of the second stroke is identical with that of the first stroke, and if so, then with respect to the intersection point between the central lines of the first and second strokes, the longitudinal stroke width $w_j$ corresponding to the intersection point on the first stroke and the longitudinal stroke width $w_j'$ corresponding to the intersection point on the second stroke are calculated, the absolute value of the difference between the longitudinal stroke widths is obtained as $n=|w_j-w_j'|$, and smooth transition processing is conducted around the intersection point between the central lines according to the value of n and the comparative size relationship between $w_j$ and $w_j'$, and then the filling gray values for the pixels corresponding to the intersection point between the central lines are calculated. In the present embodiment, the orientation of the two intersected strokes means the direction from the starting point to the ending point of each of the two intersected strokes, i.e. the positive direction or the negative direction of x-axis, which is determined specifically as follows.

with respect to the intersection point between the central lines of the first and second strokes, the longitudinal stroke width $w_j$ at the intersection point on the first stroke and the longitudinal stroke width $w_j'$ at the intersection point on the second stroke are computed, and then the absolute value of the difference therebetween $n=|w_j-w_j'|$ is obtained, after that, it is to determine whether the value of n is 0, if so, the intersection point between the first and second strokes is not further processed, otherwise, the value of n is rounded up, for example if 0<n<1, the value of n will be rounded up as 1, and then a unit step length on y-axis may be obtained as $$\frac{|w_j - w_j'|}{2 \times (n+1)};$$

next, the smooth transition processing is conducted around the intersection point between the first and second strokes by taking the corresponding points on x-axis as the start point and the end point, according to the comparative size relationship between $w_j$ and $w_j'$, which is described with the following steps of:

determining the start point and the end point: in which the point on x-axis that corresponds to the intersection point between the central lines is taken as the midpoint, the $$\frac{n}{2}th$$

or $$\frac{n+1}{2}th$$

point close to the side of the first stroke is taken as the start point, and the $$\frac{n}{2}th \text{ or } \frac{n+1}{2}th$$

point close to the side of the second stroke is taken as the end point; particularly, when the value of n is an odd value, the $$\frac{n+1}{2}th$$

points at the side of first stroke and the side of second stroke are selected respectively as the start point and end point; and when the value of n is an even value, the $\frac{n}{2}$th points at the side of the first stroke and the side of the second stroke are selected respectively as the start point and end point.

Smoothing: in which the comparative size relationship of $w_j$ and $w_j'$ is determined, and $w_j$ is taken as the initial value, starting from the start point on x-axis, and then when $w_j < w_j'$, for every increment by a unit step length towards the end point, the longitudinal stroke width $w_{r+1}$ at the corresponding point on the central line is equal to the longitudinal stroke width $w_r$ at the immediately preceding point plus the unit step lengths $$\frac{|w_j - w_j'|}{2 \times (n+1)}$$

respectively at the upper and lower sides of the central lines; when $w_j > w_j'$, for every increment by the unit step length towards the end point, the longitudinal stroke width $w_{r+1}$ at the corresponding point on the central line is equal to longitudinal stroke width $w_r$ at the immediately preceding point minus the unit step length $$\frac{|w_j - w_j'|}{2 \times (n+1)}$$

at both the upper and lower sides of the central lines; and when $w_j = w_j'$, the unit step length $$\frac{|w_j - w_j'|}{2 \times (n+1)}$$

is equal to 0.

Obtaining the gray values for corresponding pixels and filling: in which the corresponding pixels in the stroke width at the intersection point is obtained by the smooth transition processing, and the filling gray values for the corresponding pixels are calculated by the straight line filling formula: max(0, min(1.0, 0.5×$w_r$−$e_r$+0.5)), and the corresponding pixels are filled according to the filling gray values and displayed, where $w_r$ denotes the longitudinal stroke width at the corresponding point r on the central line, $e_r$ denotes the distance from the corresponding pixel to the point r, and the position information of the point r is obtained in acquiring the position information of each point on the central line of the stroke.

If it is determined that the slopes of the central lines of the first and the second strokes do not meet the above conditions, or that the orientation of the first stroke and that of the second stroke are different even though the slopes meet the above conditions, then at the intersection point between the first and second strokes, a semi-circle, of which the center is the intersection point between the central lines of the first and second strokes and the diameter is the actual stroke width $d_j$ at intersection point between the central lines, is made, and then the filling gray values for the pixels within the semi-circle are calculated, which is described in detail as follows:

it is determined whether the absolute value of the slope of the central line of the second stroke is no less than the preset slope value A or not (A=1.5 in the present embodiment), and if so, then at the intersection point between the two intersected strokes, two semi-circles, of which the centers are the intersection point between the central lines of the first and second strokes and the diameters are the actual stroke width $d_j$ at the intersection point between the central lines, are made outside the respective endpoints of the strokes, i.e. in the direction of the lines extended from the respective central lines at the endpoints, with the starting and ending points of one of the semi-circles being both located on the longitudinal stroke width $w_j$ of the first stroke, and the starting and ending points of the other one being both located on the longitudinal stroke width $w_j'$ of the second stroke, and then the filling gray values of the pixels limited by the semi-circles are calculated respectively.

In the present embodiment, if a plurality of filling gray values are calculated on the same pixel, the maximum one of the plurality of gray values is selected for filling the pixel.

If it is determined that the absolute value of the slope of the central line of the second stroke is less than the preset slope value A (i.e. less than 1.5, for example), but the orientation of the first stroke and that of the second stroke are different, then the slopes size of the central lines of the first and second strokes are further determined. At the intersection point between the first and second strokes, a semi-circle, of which the center is the intersection point between the central lines of the first and second strokes and the diameter is the actual stroke width $d_j$ corresponding to the intersection point between the central lines, is made, with both the starting and ending points of the semi-circle being located on the longitudinal stroke width corresponding to the intersection point on the stroke with the larger slope, and then the filling gray values for the pixels limited by the semi-circle are calculated.

The filling gray values for the pixels limited by the semi-circle are calculated as follows. It is determined whether the endpoint of the stroke accompanied with the semi-circle is the left endpoint or the right endpoint of the stroke, and it is further determined whether the slope of the central line of the stroke is no less than 0 or not; and if the endpoint of the stroke is the left endpoint and the slope of the central line of the stroke is no less than 0, then for a surrounded region which is above the central line of the stroke and defined by the semi-circle and the longitudinal stroke width corresponding to the intersection point between the central lines within the stroke, the filling gray values for pixels within the surrounded region are obtained by the straight line filling formula: max(0, min(1.0, 0.5×$w_z$−$e_z$+0.5)), where, the surrounded region is particularly above a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up, w denotes the longitudinal stroke width at the intersection point between the central lines within the stroke, d denotes the actual stroke width at the intersection point between the central lines within the stroke, $w_z$ denotes the longitudinal stroke width corresponding to each point in the line extended from the central line at the endpoint side of the stroke ($w_z=w$ in the present embodiment), and $e_z$ denotes the distance from the pixel to its corresponding point on the line extended from the central line at the endpoint of the stroke; then the filling gray values for the pixels within the region defined by the semi-circle other than the above surrounded region are obtained by the semi-circle filling formula: $\max(0, \min(1.0, 0.5 \times d_j - e_j + 0.5))$, where $e_j$ denotes the distance from the corresponding pixel to the intersection point, and $d_j$ denotes the actual stroke width at the intersection point.

If the endpoint of the stroke is the left endpoint of the stroke and the slope of the central line of the stroke is less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_j - e_j + 0.5))$, where, the surrounded region is particularly below a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

If the endpoint of the stroke is the right endpoint of the stroke and the slope of the central line of the stroke is no less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

If the endpoint of the stroke is the right endpoint of the stroke and the slope of the central line of the stroke is less than 0, then for a surrounded region which is above the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly above a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

Figure 3:
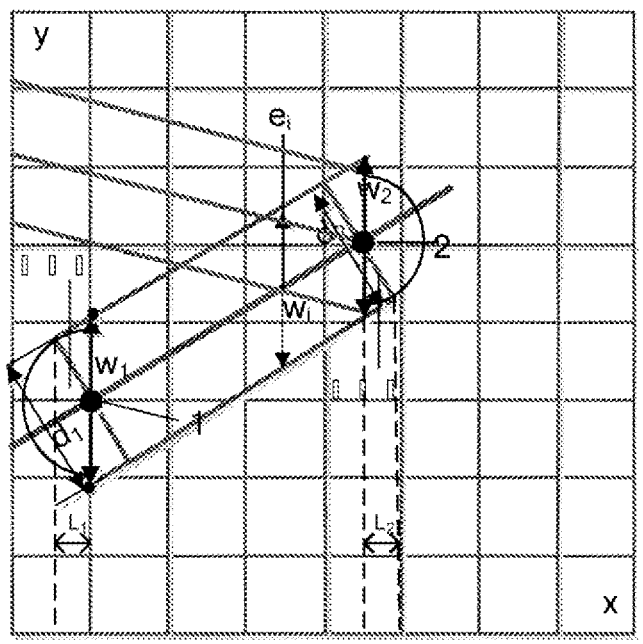
FIG. 3 is a schematic diagram of processing an intersection point between two intersected strokes according to an embodiment of the present invention.

Further description is given below in conjunction with FIG. 3. Here, the slope of central line of the first stroke determined by the sampling points 1, 2 is less than 1, and the absolute value of the slope of the central line of the second stroke which is intersected with the first stroke is also less than 1, but the orientation of the second stroke is different with that of the first stroke, therefore it is needed to further determine which one of absolute values of the slopes of the central lines of the first and second strokes is larger. As shown in FIG. 3, the slope of the central line of the first stroke is larger than that of the central line of the second stroke. Since the sampling point 2 is the right endpoint of the first stroke and the slope of the central of the first stroke is greater than 0, the processing on the intersection point (i.e. inflection point) between the first and second strokes is as follows:

a semi-circle, of which the center is the sampling point 2 (i.e. intersection point between the central lines) and the diameter is the $d_2$, is made, with both the starting and ending points of the semi-circle being located on the longitudinal stroke width $w_2$, then the filling gray values for pixels limited by the semi-circle are calculated, where the filling gray values for pixels within the surrounded region corresponding to the segment $L_2$ below the central line can be obtained by the straight line filling formula: $\max(0, \min(1.0, 0.5 \times w_z - e_z + 0.5))$, where $w_z = w_2$, and the surrounded region is particularly below a line extended from the central line at the endpoint side and corresponds to the segment $L_2$ on x-axis, which has a length of $$\frac{w_2 - d_2}{2}$$

and runs towards the right starting from a point $x_2$ on x-axis that corresponds to the sampling point 2, the position information of each point in the line extended from the central line L corresponding to the segment $L_2$ can be obtained by the DDA algorithm used in obtaining the position information of each point on the central line L, and the filling gray values for the pixels within the region defined by the semi-circle other than the above surrounded region are obtained by the semi-circle filling formula: $\max(0, \min(1.0, 0.5 \times d_2 - e_2 + 0.5))$.

Figure 4:
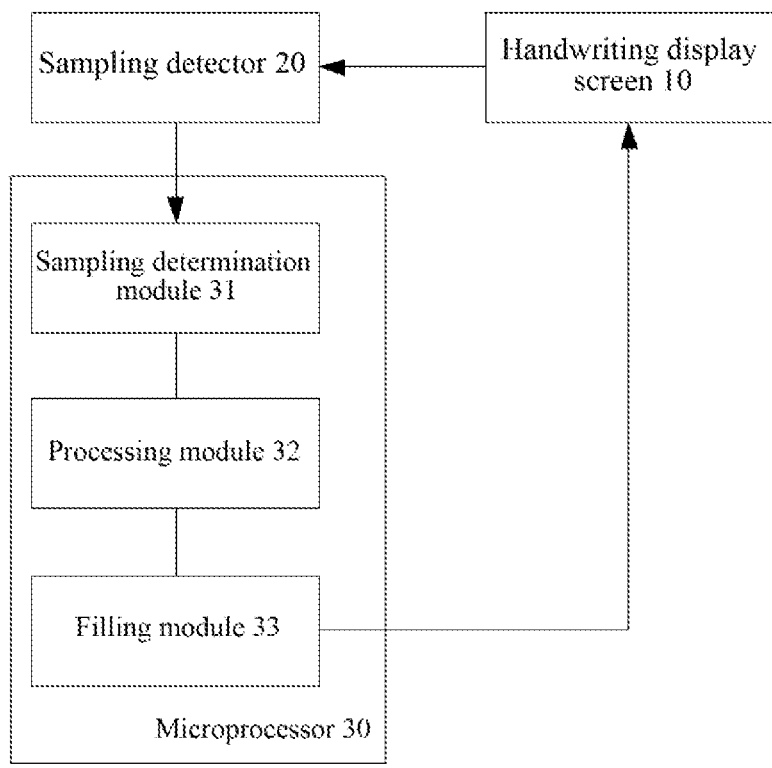
FIG. 4 is a schematic block diagram of an electronic device according to an embodiment of the present invention.

As shown in FIG. 4, the present invention also provides an electronic device, including:

a handwriting display screen 10, which is used as an interface for handwriting and for displaying the written handwriting trace;

a sampling detector 20, which is used to sample contact points of the handwriting trace to obtain position information of the sampling points and actual stroke widths at the sampling points; in the above method, the sampling frequency of the sampling detector 20 is set as 120 sampling points per second in order to ensure a good effect of the handwriting trace; the sampling detector 20 is further used to obtain the actual stroke widths at the sampling points according to the detected pressure values at the sampling points; here, the sampling detector 20 may be a pressure sampling detector 20 which detects the pressure values at the sampling points, and obtains the actual stroke widths at the sampling points by using the pressure values at the sampling points; and a microprocessor 30, which includes an original handwriting trace implementing module used for processing the stroke determined by the sampling points according to the position information of the sampling points and the actual stroke widths at the sampling points by using above method, here, processing the stroke includes the processing on the straight stroke width and the endpoint of the stroke and the intersection point between two intersected points included in the above method; the original handwriting trace implementing module is further used to obtain the filling gray values for the corresponding pixels by the straight line filling formula and the semi-circle filling formula; in the present embodiment, when a plurality of filling gray values are obtained for the same pixel, the maximum one of the plurality of filling gray values is selected; and then the corresponding pixel is filled according to the obtained filling gray values, and displayed by the handwriting display screen 10.

In the present embodiment, the microprocessor 30 includes a sampling determination module 31, a processing module 32, a filling module 33 and so on. The sampling determination module 31, which is connected with the sampling detector 20, is used to determine whether a sampling point is the endpoint of the stroke or the intersection point between the strokes according to time order, position information and so on.

The processing module 32, which is connected with the sampling determination module 31, is used to obtain the filling gray value for the pixel located at the sampling point in accordance with the determination result as to the stroke endpoint or intersection point from the sampling determination module 31, and obtain the filling gray value for each pixel within the stroke between the adjacent sampling points. The specific process is mentioned as the above method and will not be described again.

The filling module 33, which is connected with the processing module 32, is used to fill each pixel according to the filling gray value obtained by the processing module 32, and the pixel is then displayed by the handwriting display screen 10 or other display screen, thus implementing the display of the original handwriting trace.

In the method provided by the present invention, the actual stroke widths of the stroke are all converted into one direction, and in acquiring the filling gray value for the corresponding pixel, the distance from the pixel to the point corresponding to it on the central line can be obtained just by simple addition and subtraction operations, therefore, the present invention not only implements the original handwriting trace with the stylized trace, but also significantly reduces the system overhead, thus accelerating the system processing and providing smooth writing experience to the user.

In addition, in the method provided by the present invention, the semi-circle with respect to the endpoint of the stroke and intersection point between the strokes is further provided to define the corresponding pixels, which are classified according to actual conditions, and the filling gray values can be obtained for pixels with respect to the endpoint and intersection point through different filling formulas, so that the endpoint of the stroke and the inflection point is smooth without saw teeth, and the stylized trace can be displayed with a better effect and quickly.

In particular, the electronic device provided by the present invention is a tablet PC, and a handwriting pen is used for handwriting input.

What is described above is the further detailed explanation of the present invention in combination with the specific embodiments; however, it cannot be considered that the specific embodiments of the present invention are only limited to the explanation. For those ordinary skilled in the art, some simple deductions or replacements can also be made without departing from the concept of the present application, and shall fall within the scope of the present application.

The invention claimed is:

1. A method for implementing an original handwriting trace, characterized in that it includes implementation of an intersection point between two intersected strokes by:

a step of determining a stroke width, in which a handwriting trace is sampled continuously and adjacent sampling points are determined according to the sampling time order, with the former one of the adjacent sampling points is determined as a starting sampling point and the latter one of the adjacent sampling points is determined as an ending sampling point; and pressure values and position information of the respective sampling points are detected, and actual stroke widths at the sampling points are determined according to the respective pressure values;

a step of setting a main line, in which a line from the starting sampling point to the ending sampling point is used as a central line of the stroke between the two adjacent sampling points, the position information of and a longitudinal stroke width at each point on the central line are obtained, and one of the central lines of the two intersected strokes is set as the main line in the x-axis direction;

a step of determining, in which filling gray values for pixels corresponding to the intersection point between the two intersected strokes are calculated, according to the position information of and the longitudinal stroke width at each point on the central lines of the two intersected strokes, as well as slopes of the central lines of the two intersected strokes and orientation of the two intersected strokes; and a step of displaying, in which the corresponding pixels are filled according to the filling gray values and displayed.

2. The method of claim 1, characterized in that the step of setting a main line includes: determining the two intersected strokes as a first stroke and a second stroke, respectively, based on the time order, and setting the central line of the first stroke as the main line in the x-axis direction.

3. The method of claim 2, characterized in that the step of determining includes: determining whether an absolute value of the slope of the central line of the second stroke is less than a preset slope value A, and if so, further determining whether the orientation of the second stroke is identical with that of the first stroke, and if so, then with respect to an intersection point between the central lines of the first and second strokes, calculating the longitudinal stroke width $w_j$ corresponding to the intersection point on the first stroke and the longitudinal stroke width $w_j'$ corresponding to the intersection point on the second stroke, and obtaining an absolute value of the difference between the longitudinal stroke widths as $n=|w_j-w_j'|$; then, conducting smooth transition processing around the intersection point between the central lines according to the value of n and the comparative size relationship between $w_j$ and $w_j'$, and calculating the filling gray values for pixels corresponding to the intersection point between the first and second strokes.

4. The method of claim 2, characterized in that the step of determining includes that: it is determined whether the absolute value of the slope of the central line of the second stroke is no less than the preset slope value A, and if so, then two semi-circles, of which centers are located at the intersection point between the central lines of the first and second strokes and diameters are the actual stroke width $d_j$ corresponding to the intersection point between the central lines, are made at the intersection point between the first and second strokes, with both the starting and ending points of one of the semi-circles being located on the longitudinal stroke width $w_j$ of the first stroke, and both the starting and ending points of the other being located on the longitudinal stroke width $w_j'$ of the second stroke; then the filling gray values for pixels limited by the two semi-circles are calculated respectively.

5. The method of claim 2, characterized in that the step of determining includes that: if it is determined that the absolute value of the slope of the central line of the second stroke is less than the preset slope value A, but the orientation of the second stroke is different with that of the first stroke, then the comparative size relationship between the slopes of the central lines of the first and the second strokes are further determined; then one semi-circle, of which the center is located at the intersection point between the central lines of the first and second strokes and the diameter is the actual stroke width $d_j$ corresponding to the intersection point between the central lines, is made at the intersection point between the first and second strokes, with both the starting and ending points of the semi-circle being located on the longitudinal stroke width corresponding to the intersection point on the stroke with the larger slope, and then the filling gray values for pixels limited by the semi-circle are calculated.

6. The method of claim 3, characterized in that conducting the smooth transition processing according to the value of n and the comparative size relationship between $w_j$ and $w_j'$ includes the following steps made at the intersection point:

it is determined whether the value of n is equal to 0, and if so, the intersection point is not further processed, otherwise, the value of n is rounded up, and if $0<n<1$, n takes a value of 1, and then, a unit step length on y-axis is equal to $$\frac{|w_j - w_j'|}{2 \times (n+1)};$$

the point on x-axis that corresponds to the intersection point between the central lines is taken as the midpoint, the $$\frac{n}{2}th \text{ or } \frac{n+1}{2}th$$

point close to the side of the first stroke is taken as the start point, and the $$\frac{n}{2}th \text{ or } \frac{n+1}{2}$$

th point close to the side of the second stroke is taken as the end point; and by taking $w_j$ as the initial value and starting from the start point on x-axis, for every increment by a unit step length towards the end point, the longitudinal stroke width $w_{r+1}$ at the corresponding point on the central line is equal to the longitudinal stroke width $w_r$ at the immediately preceding point on the central line plus or minus the unit step length $$\frac{|w_j - w_j'|}{2 \times (n+1)}$$

at both the upper and lower sides of the central line.

7. The method of claim 1, characterized in that calculating the filling gray values for the pixels corresponding to the intersection point between the two intersected strokes includes: calculating the distance $e_r$ from the pixel to a point r on the central line that corresponds to said pixel, and then obtaining the filling gray value for the corresponding pixel by the straight line filling formula: $\max(0, \min(1.0, 0.5 \times w_r - e_r + 0.5))$, where $w_r$ denotes the longitudinal stroke width at the corresponding point r on the central line.

8. The method of claim 4, characterized in that calculating the filling gray values for the pixels limited by the semi-circle includes:

it is first determined whether the endpoint of the stroke accompanied with the semi-circle is a left or right endpoint of the stroke, and it is further determined whether the slope of the central line of the stroke is no less than 0 or not; and if the endpoint of the stroke is the left endpoint and the slope of the central line of the stroke is no less than 0, then for a surrounded region which is above the central line of the stroke and defined by the semi-circle and the longitudinal stroke width corresponding to the intersection point between the central lines within the stroke, the filling gray values for pixels within the surrounded region are obtained by a straight line filling formula: $\max(0, \min(1.0, 0.5 \times w_z - e_z + 0.5))$, where, the surrounded region is particularly above a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up, w denotes the longitudinal stroke width at the intersection point between the central lines within the stroke, d denotes the actual stroke width at the intersection point between the central lines within the stroke, $w_z$ denotes the longitudinal stroke width corresponding to each point in the line extended from the central line at the endpoint side of the stroke, and $e_z$ denotes the distance from the pixel to its corresponding point on the line extended from the central line at the endpoint of the stroke; the filling gray values for the pixels within a region defined by the semi-circle other than the above surrounded region are obtained by a semi-circle filling formula: $\max(0, \min(1.0, 0.5 \times d_j - e_j + 0.5))$, where $e_j$ denotes the distance from the corresponding pixel to the intersection point, and $d_j$ denotes the actual stroke width at the intersection point; and if the endpoint of the stroke is the left endpoint of the stroke and the slope of the central line of the stroke is less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$;

if the endpoint of the stroke is the right endpoint of said stroke and the slope of the central line of said stroke is no less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$; and if the endpoint of the stroke is the right endpoint of the stroke and the slope of the central line of the stroke is than 0, then for a surrounded region which is above the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly above a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

9. The method of claim 8, characterized in that if a plurality of filling gray values are provided for a certain pixel, the maximum one of the plurality of gray values is selected.

10. A method of the implementing an original handwriting trace, including implementation of the straight stroke width of a stroke by:
 a step of determining a stroke width, in which a handwriting trace is sampled continuously, and position information of and actual stroke widths at the respective sampling points are detected;
 a step of processing, in which the former sampling point of every two adjacent sampling points is taken as the starting sampling point and the latter sampling point is taken as the ending sampling point, and a line from the starting sampling point to the ending sampling point is taken as the central line of the stroke between the starting and ending sampling points, and then position information of and a longitudinal stroke width at each point on the central line are obtained, and the filling gray value for each pixel within the stroke is determined according to the position information of and the longitudinal stroke width at each point on the central line; and
 a step of displaying, in which the pixels are filled according to the corresponding filling gray values and displayed.

11. The method of claim 10, characterized in that obtaining the longitudinal stroke width at each point on the central line includes that:

the values of the respective actual stroke widths $d_1$ and $d_n$ of the starting sampling point and the ending sampling point are translated onto y-axis to obtain the corresponding longitudinal stroke widths $w_1$ and $w_n$, and the difference between $w_1$ and $w_n$ is compared with the difference $(x_1-x_n)$ between x-axis coordinates of the starting sampling point and the ending sampling point to obtain a unit step length $$\frac{w_1 - w_n}{(x_1 - x_n)};$$

then by taking a point on x-axis that corresponds to the starting sampling point as the start point, taking a point on x-axis that corresponds to the ending sampling point as the end point, and taking $w_1$ as the initial value on y-axis, the longitudinal stroke width $w_{i+1}$ at each corresponding point on the central line is equal to the longitudinal stroke width $w_i$ at the immediately preceding point plus the unit step length $$\frac{w_1 - w_n}{(x_1 - x_n)},$$

for every increment by the unit step length towards the end point on x-axis.

12. The method of claim 10, characterized in that the specific process of determining the filling gray value for each pixel within the stroke includes:

calculating the distance $e_i$ from the pixel to the point on the central line that corresponds to the pixel, and obtaining the filling gray value for the pixel by the straight line filling formula: $\max(0, \min(1.0, 0.5 \times w_i - e_i + 0.5))$.

13. The method of claim 10, characterized in that it further includes implementation of the endpoint of the stroke by:

a step of determining, in which it is determined whether the sampling point is the endpoint of the stroke; and a step of processing, in which a semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated.

14. The method of claim 13, characterized in that the determining whether the sampling point is the endpoint of the stroke includes: determining whether the stroke is intersected with another stroke at the sampling point, and if the stroke is not intersected with another stroke at the sampling point, then determining the sampling point as the endpoint of the stroke.

15. The method of claim 13, characterized in that the calculating the filling gray values for the pixels limited by the semi-circle includes that:

it is determined whether the endpoint of the stroke is the left or right endpoint of the stroke, and whether the slope of the central line of the stroke is no less than 0 or not; and if the endpoint of the stroke is the right endpoint of the stroke and the slope of the central line of the stroke is no less than 0, then for a surrounded region which is below the central line and defined by the semi-circle and the longitudinal stroke width $w_k$ at the endpoint k of the central line that corresponds to the right endpoint, the filling gray values for pixels within the surrounded region are obtained by the straight line filling formula: $\max(0, \min(1.0, 0.5 \times w_s - e_s + 0.5))$, where, the surrounded region is particularly below the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: $\max(0, \min(1.0, 0.5 \times d_k - e_k + 0.5))$, where $e_k$ denotes the distance from the corresponding pixel to the endpoint k of the central line;

if the endpoint of the stroke is the right endpoint of the stroke and the slope of the central line of the stroke is less than 0, then for a surrounded region which is above the central line and defined by the semi-circle and the longitudinal stroke width $w_k$ at the endpoint k of the central line that corresponds to the right endpoint, the filling gray values for pixels within the surrounded region are obtained by the straight line filling formula: $\max(0, \min(1.0, 0.5 \times w_s - e_s + 0.5))$, where, the surrounded region is particularly above the line extended from the central line and corresponds to a segment on x-axis, which has a length of $$\frac{w_k - d_k}{2}$$

and runs towards the right starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: max(0, min(1.0, 0.5×$d_k$−$e_k$+0.5)), where $e_k$ denotes the distance from the corresponding pixel to the endpoint k of the central line;

if the endpoint of the stroke is the left one of the stroke and the slope of the central line of the stroke is no less than 0, then for a surrounded region which is above the central line and defined by the semi-circle and the longitudinal stroke width $w_k$ at the endpoint k of the central line that corresponds to the left endpoint, the filling gray values for pixels within the surrounded region are obtained by the straight line filling formula: max(0, min(1.0, 0.5× $w_s$−$e_s$+0.5)), where, the surrounded region is particularly above the line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: max(0, min(1.0, 0.5×$d_k$−$e_k$+0.5)), where $e_k$ denotes the distance from the corresponding pixel to the endpoint k of the central line;

if the endpoint of the stroke is the left one of the stroke and the slope of the central line of the stroke is no less than 0, then for a surrounded region which is below the central line and defined by the semi-circle and the longitudinal stroke width $w_k$ at the endpoint k of the central line that corresponds to the left endpoint, the filling gray values for pixels within the surrounded region are obtained by the straight line filling formula: max(0, min(1.0, 0.5× $w_s$−$e_s$+0.5)), where, the surrounded region is particularly below the line extended from the central line and corresponds to a segment on x-axis, which has a length of $$\frac{w_k - d_k}{2}$$

and runs towards the left starting from a point on x-axis that corresponds to the sampling point corresponding to the endpoint of the stroke, here, $$\frac{w_k - d_k}{2}$$

is rounded up, $w_s$ denotes the longitudinal stroke width at each point in the line extended from the central line at the endpoint of the stroke, and $e_s$ denotes the distance from a pixel to its corresponding point on the line extended from the central line at the endpoint of the stroke; the filling gray values for pixels within a region defined by the semi-circle other than the above surrounded region are obtained by the semi-circle filling formula: max(0, min(1.0, 0.5×$d_k$−$e_k$+0.5)), where $e_k$ denotes the distance from the corresponding pixel to the endpoint k of the central line.

16. An electronic device, characterized in that it includes:
- a handwriting display screen, used as an interface for handwriting and for displaying a written handwriting trace;
- a sampling detector, used for sampling contact points of the handwriting trace to obtain position information of the sampling points and actual stroke widths at the sampling points; and
- a microprocessor, which includes an original handwriting trace implementing module, which implements the display of the original handwriting trace by the method of claim 1.

17. A method for implementing an original handwriting trace, characterized in that it includes:
- a step of determining a stroke width, in which a handwriting trace is sampled continuously in time order, and position information of and actual stroke widths at the respective sampling points are detected;
- a step of processing, in which the former sampling point of every two adjacent sampling points is taken as the starting sampling point and the latter sampling point is taken as the ending sampling point, and a line from the starting sampling point to the ending sampling point is taken as the central line of the stroke between the starting and ending sampling points, and then position information of and a longitudinal stroke width at each point on the central line are obtained, and the filling gray value for each pixel within the stroke is determined according to the position information of and the longitudinal stroke width at each point on the central line; and
- a step of displaying, in which the pixels are filled according to the corresponding filling gray values and displayed.

18. The method of claim 17, characterized in that it further includes:
- a step of determining whether the sampling point is the endpoint of the stroke or the intersection point between the strokes, in which it is determined whether the stroke is intersected with another stroke at the sampling point, and if not, then the sampling point is determined as the endpoint; if the stroke is intersected with another stroke at the sampling point, then the sampling point is determined as the intersection point between the two intersected strokes; and
- a step of processing the endpoint of the stroke or the intersection point between the strokes, in which if the sampling point is determined as the endpoint of the stroke, then a semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated;
- and if the sampling point is determined as the intersection point between the two intersected strokes, then one of the central lines of the two intersected strokes is set as a main line in the x-axis direction, and then the filling gray values for the pixels corresponding to the intersection point between the two intersected strokes are calculated, based on the position information of and the longitudinal stroke width at each point on the central lines of the two intersected strokes, as well as the slopes of the central lines of the two intersected strokes and orientation of the two intersected strokes.

19. The method of claim 18, characterized in that calculating the filling gray values for the pixels corresponding to the intersection point between the two intersected strokes includes: calculating the distance $e_r$ from the pixel to a point r on the central line that corresponds to the pixel, and obtaining the filling gray values for the corresponding pixels by the straight line filling formula: $\max(0, \min(1.0, 0.5 \times w_r - e_r + 0.5))$, where $w_r$ denotes the longitudinal stroke width at the corresponding point r on the central line.

20. The method of claim 19, characterized in that the filling gray value for each pixel within the stroke between the starting sampling point and the ending sampling point is calculated by:
    calculating the distance $e_i$ from the pixel to a point on the central line that corresponds to the pixel, and obtaining the filling gray value for the corresponding pixel by the straight line filling formula: $\max(0, \min(1.0, 0.5 \times w_i - e_i + 0.5))$.

21. A device for implementing an original handwriting trace, including:
    a sampling detector, used for sampling a handwriting trace in real time and detecting position information of sampling points, and obtaining actual stroke widths at the sampling points; and
    a microprocessor, which is connected with the sampling detector, used for determining a central line of a stroke between adjacent sampling points, in accordance with the position information of the sampling points, and acquiring the position information of and a longitudinal stroke width at each point on the central line, and determining the filling gray value for each pixel within the stroke according to the position information of and the longitudinal stroke width at the respective point on the central line.

22. The device of claim 21, characterized in that the sampling detector is a pressure sampling detector, which detects the pressure values at the sampling points and obtains the actual stroke widths at the sampling points by using the pressure values at the sampling points;
    the microprocessor includes: a sampling determination module, which is connected with the sampling detector and used for determining whether the sampling point is endpoint of the stroke or intersection point between the strokes;
    a processing module, which is connected with the sampling determination module and used for obtaining the filling gray value for the pixel at the sampling point in accordance with the determination result from the sampling determination module, and obtaining the filling gray value for each pixel within the stroke between the adjacent sampling points; and
    a filling module, which is connected with the processing module, and used for filling each pixel in accordance with the filling gray value obtained by the processing module.

23. The device of claim 22, characterized in that the obtaining the filling gray value for each pixel by the processing module in accordance with the determination result from the sampling determination module is specifically as follows:
    if the sampling point is the endpoint of the stroke, then a semi-circle, of which the center is the endpoint k of the central line that corresponds to the endpoint of the stroke and the diameter is the actual stroke width $d_k$ corresponding to the endpoint k of the central line, is made, with both the starting and ending points of the semi-circle being located on the longitudinal stroke width $w_k$ corresponding to the center of the semi-circle, and then the filling gray values for pixels limited by the semi-circle are calculated; and
    if the sampling point is the intersection point between the two intersected strokes, then one of the central lines of the two intersected strokes is set as the main line in the x-axis direction, and the filling gray values for the pixels corresponding to the intersection point between the two intersected strokes are calculated, based on the position information of each point on the central lines of the two intersected strokes and the longitudinal stroke width at the point, as well as the slopes of the central lines of the two intersected strokes and the orientation of the two intersected strokes.

24. The method of claim 5, characterized in that calculating the filling gray values for the pixels limited by the semi-circle includes:
    it is first determined whether the endpoint of the stroke accompanied with the semi-circle is a left or right endpoint of the stroke, and it is further determined whether the slope of the central line of the stroke is no less than 0 or not; and if the endpoint of the stroke is the left endpoint and the slope of the central line of the stroke is no less than 0, then for a surrounded region which is above the central line of the stroke and defined by the semi-circle and the longitudinal stroke width corresponding to the intersection point between the central lines within the stroke, the filling gray values for pixels within the surrounded region are obtained by a straight line filling formula: $\max(0, \min(1.0, 0.5 \times w_z - e_z + 0.5))$, where, the surrounded region is particularly above a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up, w denotes the longitudinal stroke width at the intersection point between the central lines within the stroke, d denotes the actual stroke width at the intersection point between the central lines within the stroke, $w_z$ denotes the longitudinal stroke width corresponding to each point in the line extended from the central line at the endpoint side of the stroke, and $e_z$ denotes the distance from the pixel to its corresponding point on the line extended from the central line at the endpoint of the stroke; the filling gray values for the pixels within a region defined by the semi-circle other than the above surrounded region are obtained by a semi-circle filling formula: $\max(0, \min(1.0, 0.5 \times d_j - e_j + 0.5))$, where $e_j$ denotes the distance from the corresponding pixel to the intersection point, and $d_j$ denotes the actual stroke width at the intersection point; and if the endpoint of the stroke is the left endpoint of the stroke and the slope of the central line of the stroke is less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the left starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$;

if the endpoint of the stroke is the right endpoint of said stroke and the slope of the central line of said stroke is no less than 0, then for a surrounded region which is below the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly below a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$; and if the endpoint of the stroke is the right endpoint of the stroke and the slope of the central line of the stroke is less than 0, then for a surrounded region which is above the central line of the stroke and defined by the semi-circle and the longitudinal stroke width w corresponding to the intersection point between the central lines within the stroke, the filling gray values for pixels within the surrounded region are obtained by the straight line filling formula: $\max(0, \min(1.0, 0.5 \times w_z - e_z + 0.5))$, where, the surrounded region is particularly above a line extended from the central line and corresponds to a segment on x-axis, which has a length of $$\frac{w-d}{2}$$

and runs towards the right starting from a point on x-axis that corresponds to the sampling point corresponding to the endpoint of the stroke; where $$\frac{w-d}{2}$$

is rounded up; then the filling gray values for the pixels within the region defined by the semi-circle other than the above surrounded region are obtained by the semi-circle filling formula: $\max(0, \min(1.0, 0.5 \times d_j - e_j + 0.5))$.

25. An electronic device, characterized in that it includes:
a handwriting display screen, used as an interface for handwriting and for displaying a written handwriting trace;
a sampling detector, used for sampling contact points of the handwriting trace to obtain position information of the sampling points and actual stroke widths at the sampling points; and
a microprocessor, which includes an original handwriting trace implementing module, which implements the display of the original handwriting trace by the method of claim 10.

* * * * *